Sept. 9, 1969     G. J. GANLEY     3,465,709
CONTROL APPARATUS
Filed Oct. 7, 1965     2 Sheets-Sheet 1
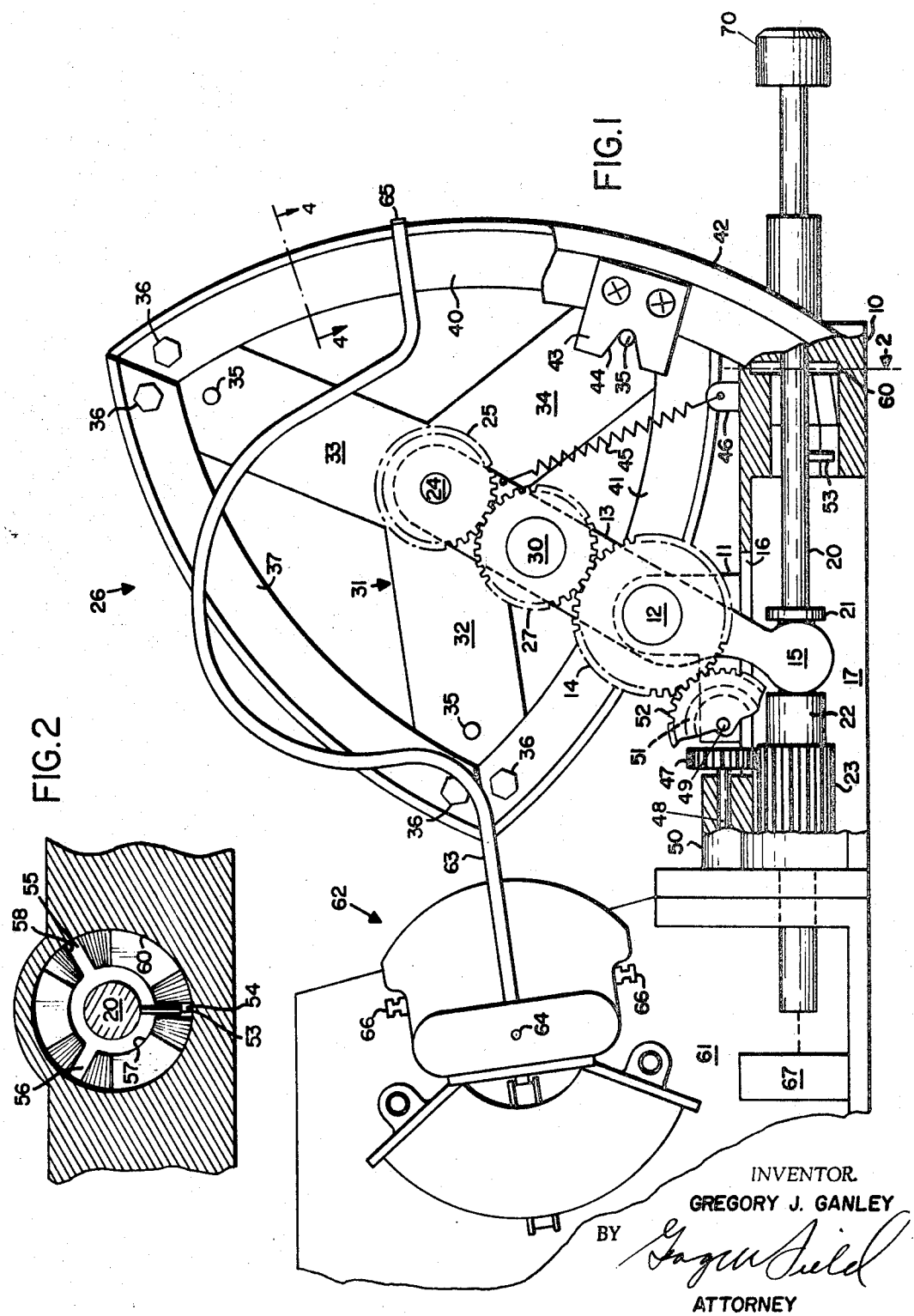
INVENTOR.
GREGORY J. GANLEY
BY
ATTORNEY Sept. 9, 1969  G. J. GANLEY  3,465,709
CONTROL APPARATUS Filed Oct. 7, 1965  2 Sheets-Sheet 2

INVENTOR.
GREGORY J. GANLEY
BY
ATTORNEY

United States Patent Office 3,465,709
Patented Sept. 9, 1969

3,465,709
CONTROL APPARATUS
Gregory J. Ganley, Minneapolis, Minn., assignor to Honeywell Inc., Minneapolis, Minn., a corporation of Delaware
Filed Oct. 7, 1965, Ser. No. 493,778
Int. Cl. G01r *1/38, 15/10;* G09f *9/00*
U.S. Cl. 116—129                              9 Claims

ABSTRACT OF THE DISCLOSURE

A scale change mechanism, for an instrument having an index moveable at a first radius, including a plurality of scales each configured to the first radius together with means mounting the scales for unitary rotation about a center which is closer to the scales than the length of the first radius, the path of the rotation being generally aligned with the direction of movement of the index, and together with mechanical means for causing the rotation and also causing unitary translation of the scales with respect to the center.

---

This invention relates to the field of control devices, and more particularly to multi-scale indicators for use in such devices. Briefly the invention comprises means for bringing any selected one of a plurality of graduated scales into contiguity with the path of a movable index to make possible the direct reading of the value of any one of a plurality of quantities from the scale, according as the desired quantity is supplied to actuate the index. My invention has advantages of small size and weight, exact positioning, and the combination of reliability with versatility which results from amnual operation reenforced by judicious mechanical interlocking.

Figure 4:
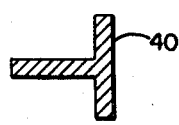
Figure 3:
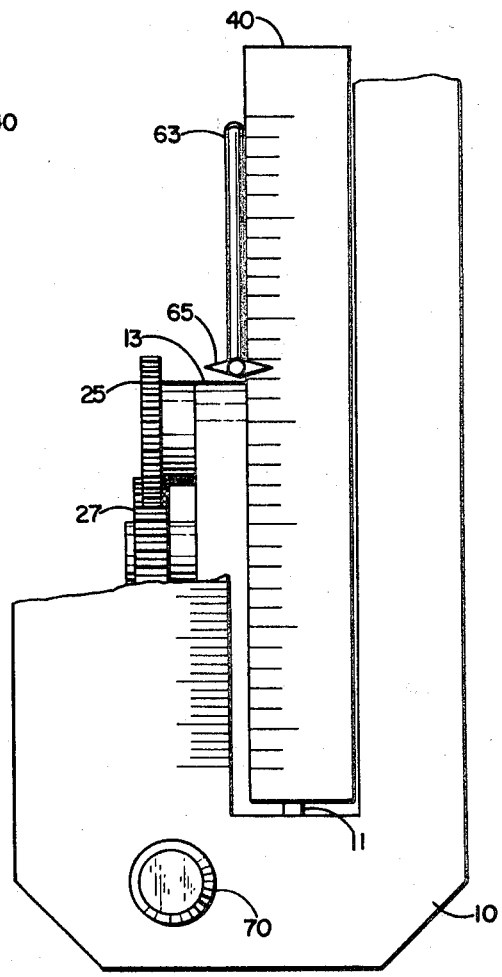

FIGURE 1 in the accompanying drawing is a general view of one embodiment of my invention, and FIGURE 2 is an enlarged fragmentary sectional view taken along the broken line 2 of FIGURE 1. FIGURE 3 is an end view of the apparatus of FIGURE 1, and FIGURE 4 is a cross-section taken along the line 4—4 of FIGURE 1.

In the drawing a complex base casting 10 is shown to have an upward projection 11 which is cross-bored to carry a shaft 12 which acts as the pivot for a lever 13. A gear 14 is also mounted for rotation about shafts 12, which defines one of certain axes referred to in the claims below. One end of lever 13 is configured as a cam 15. This end projects through a slot 16 in base 10 into a cavity 17 formed in the base, and is bifurcated to straddle a shaft 20 extending horizontally and carried by the base for axial and rotary movement with respect thereto. Cam 15 is engaged between a collar 21 on shaft 20 and the hub 22 of a broad faced gear 23 also secured on shaft 20 by suitable means not shown. Axial movement of shaft 20 thus causes rotation of lever 13 about shaft 12.

The end of lever 13 opposite cam 15 serves as a bearing for a further shaft 24 carrying a gear 25 and a reference assembly, generally identified by the reference numeral 26, for unitary rotation. Shaft 24 defines another of the axes referred to in the claims. An idler gear 27 rotatable on a shaft 30 carried by arm 13 is provided to drive gear 25 from gear 14.

Assembly 26 comprises an end member 31 having radially extending arms 32, 33, and 34. A plurality of pins 35 are carried by these arms, and are located symmetrically about and at equal distances from the center shaft 24. Secured to the arms of end member 31 by suitable means 36 are a plurality of graduated scales, of which three are shown in the FIGURE 1 and identified by reference numerals 37, 40, and 41. These scales are arcuate in configuration, with equal radii greater than the greatest distance thereto from the axis of shaft 24.

A frame 42 extending upwardly from base 10, and shown broken away to more clearly illustrate scale 40, carries a bracket 43 with a tapered groove 44. A tension spring 45 extends from arm 13 to an aperture tab 46 projecting from base 10. When any of pins 35 is in groove 44 the action of spring 45 maintains reference member 26 in a precise location with respect to base 10: the limit of axial travel of shaft 20 to the left is also determined.

In this position of shaft 20 the right hand portion of gear 23 is engaged by a pinion 47 carried on a horizontal shaft 48 in boss 50 extending from base 10. Pinion 47 meshes with a set of face teeth 51 projecting from a gear 52 pivoted at 49, which also has the usual spur teeth about its circumference: the latter mesh with gear 14 regardless of the rotated position of arm 13. By the above arrangement it is clear that shaft 20 is at all times rotationally connected through gear elements 23, 47, 51, 52, 14, 27, and 25 to reference assembly 26.

In one embodiment of the invention the gear ratios were chosen to give a 1:1 relation between the rotation of shaft 20 and the rotation of reference assembly 26.

To prevent rotation of shaft 20 from being inadvertently accomplished, a pin 53 projects radially from shaft 20. In the normal position of the shaft, pin 53 is received in one of three grooves 54, 55 and 56 extending radially outward from a bore 57 in base 10, thus preventing rotation of shaft 20. However, when the shaft is displaced axially to the right the pin passes into a circular enlargement 60 of the bore which is sufficiently large in diameter to permit the pin to rotate with the shaft. The grooves are outwardly tapered toward enlargement 60 to assist in guiding the pin into one of the grooves: the arrangement is such that when one of pins 35 is in the groove in bracket 43, pin 53 is in one of grooves 54, 55, and 56.

Fixed to base 10 by any suitable means is a base extension 61 on which is mounted an actuator 62 of the meter-movement type including an elongated arm 63 pivoted at 64 and carrying an index 65 at its outer end. Actuator 62 operates to displace arm 63 along the arc of a circle centered at 64, the extent of the displacement of index 65 being determined by an electrical signal supplied to a pair of terminals 66. The radius of arcuate scales 37, 40, and 41 is substantially the same as the distance from pivot 64 to index 65.

It is to be noted that the pivotal axes of movement 62 and arm 13 are aligned in parallel relationship with the axis of rotation of reference assembly 26, and that this alignment continues regardless of operation of shaft 20.

In use, scales 37, 40 and 41 are graduated in terms of three quantities to be measured. The user pulls shaft 20 to the right, by a suitable manual knob 70, and then rotates shaft 20 through approximately a prescribed angle: when the knob is released spring 45 drives arm 13 and hence reference member 26 to the right and simultaneously pushes shaft 20 to the left. Pin 53 is guided into the appropriate groove in bore 57, and pin 35 is guided into the groove 44. The user may then switch the appropriate electrical signal to terminals 66 of movement 62.

If desired a suitable multi-position selector switch may be mounted for rotation by shaft 20 as suggested in 67, but this is an added refinement not essential to the inventor contribution here.

It will be appreciated that reference member 26 may be modified to include more than three scales or to omit a scale without departing from the teaching of my invention, which is defined by the broad general meaning of the terms in which the appended claims are expressed.

I claim as my invention:
1. In combination:
a base member;
an index;

means mounted on said base member and connected to said index for causing movement of said index with respect to said base member along a predetermined elongated path;

a reference assembly having an axis of rotation and including a plurality of scales configured in conformity with said path and angularly spaced about said axis in generally end-to-end relation to one another and in generally orthogonal relation to said axis; and selector means mounted on said base member and connected to said reference assembly and including a first portion for causing rotation of said assembly about said axis and a second portion for causing revolution of said assembly about an axis in said base member so that said axis of rotation remains parallel to itself, whereby any one of said scales may be brought into contiguity with said path.

2. Apparatus according to claim 1 in which said path is a circular arc lying in a plane normal to said axis of rotation and having a radius greater than the greatest distance from said axis to said scales.

3. Apparatus according to claim 1 in which said selector means comprises a drive member and means mounting said member for movement in rotation and translation.

4. Apparatus according to claim 3 together with means for preventing said member from being rotated until after it has been translated.

5. Apparatus according to claim 1 including means carried in part by said selector means for determining a normal position of said selector means corresponding to a condition of contiguity between said path and one of said scales.

6. Apparatus according to claim 1 wherein said base means includes means for determining a plurality of normal positions of said selector means corresponding to conditions of contiguity between said path and said plurality of scales.

7. Apparatus according to claim 1 in which said selector means includes an arm carrying said reference assembly and pivoted about a second axis aligned with said first axis.

8. Apparatus according to claim 7 in which said selector means comprises a gear train including a first gear rotatable with said reference member about said first axis and a second gear rotatable about said second axis.

9. In combination:

a base member;

an index;

means pivotally mounted on said base member and connected to said index for causing movement of said index with respect to said member along a predetermined alongated arcuate path of known radius;

a reference assembly having a first axis of rotation and including a plurality of arcuate scales having generally the same radius as that of said path and angularly spaced about said axis in generally end-to-end relation to one another and in generally orthogonal relation to said axis;

selector means including a portion journalled in said member for pivotal movement about a second axis and pivotally receiving said assembly with said first axis substantially parallel to said second axis, another portion including gear means for causing rotation of said assembly about said first axis, and a further portion including cam means for causing said pivotal movement of the first named portion about said second axis so as to cause revolution of said assembly about said second axis;

an operating member; and means movably supporting said operating member in said base member for rotation and translation to actuate the two last named portions of said selector means.

References Cited

UNITED STATES PATENTS

| | | | |
|---|---|---|---|
| 2,101,296 | 12/1937 | Simpson et al. | 324—115 |
| 2,103,606 | 12/1937 | Abrahamsohn et al. | 324—115 |
| 2,122,998 | 7/1938 | Brodton | 116—124.1 |
| 2,154,066 | 4/1939 | De Giers | 116—133 XR |
| 2,437,306 | 3/1948 | Ramsay | 116—124.1 |
| 2,464,190 | 3/1949 | Lian-Tong Wen | 73—431 |
| 2,885,536 | 5/1959 | Green et al. | 116—129 XR |

LOUIS J. CAPOZI, Primary Examiner

U.S. Cl. X.R.

324—115